United States Patent Office 3,270,063
Patented August 30, 1966

3,270,063
METHODS OF MAKING PRIMARY MERCAPTANS
Joseph Fath, Barrington, R.I., and John M. Kolyer, Seekonk, Mass., assignors to Thompson Chemical Company, a corporation of Rhode Island
No Drawing. Filed May 2, 1963, Ser. No. 277,493
13 Claims. (Cl. 260—609)

This invention concerns a process for preparing primary mercaptans by the addition of a thio acid, for example: thioacetic acid, to olefinically unsaturated compounds carrying a terminal unsaturation to produce a thiol ester, which is then saponified to give the primary mercaptan.

Primary mercaptans, especially those of higher molecular weight, are valuable as chain transfer agents; that is, additives which control the chain length and the degree of cross-linking in the preparation of synthetic rubber and other polymers. The two synthetic routes now in commercial practice both require, as a starting raw material, the use of the alcohol corresponding in chain length and configuration to the desired mercaptan. In one case, this alcohol is converted to the alkyl chloride which is then reacted with sodium hydrosulfide to form the mercaptan. In the other case, the alcohol is reacted directly with $H_2S$ in a vapor phase reaction over a dehydration-type catalyst (e.g. thoria).

For economic and process reasons, addition of $H_2S$ to the corresponding olefin would be superior to both these methods, particularly in view of increasing availability of alpha olefins. However, this addition must be directed so that the anti-Markownikoff product, the desired primary mercaptan, is formed in preference to the Markownikoff product, which is invariably a secondary or tertiary mercaptan depending on the position of the double bond. This directed addition is quite possible, but all known methods for carrying it out involve difficult and delicately balanced process conditions, such as, extremely low temperatures, irradiation, and high pressures (in autoclaves).

A most persistent difficulty in all these methods is the formation of sulfide. This is brought about by the fact that the initial amount of mercaptan formed is able to react further with unreacted olefin raw material present. The desired end product—the mercaptan, therefore, competes with the hydrogen sulfide in reacting with olefin to form an undesirable and essentially valueless by-product from which mercaptan cannot be readily regenerated.

These competing reactions are illustrated by the following equations:

$$R—CH=CH_2 + H_2S \rightarrow R—CH_2CH_2—SH$$

$$R—CH=CH_2 + HS—CH_2CH_2—R \rightarrow$$
$$R—CH_2CH_2—S—CH_2CH_2—R$$

The rate of the second reaction is appreciable compared to the first, so that a sizeable part of the mercaptan formed by the desired reaction is lost to form the undesired dialkyl sulfide.

This difficulty is not troublesome in the formation of certain higher tertiary mercaptans, presumably because the mercaptan is sterically hindered about the thiol group and is relatively unreactive toward olefin, but in preparing primary mercaptans by addition of $H_2S$, directed or not, to olefins, a large excess of $H_2S$ is needed to suppress sulfide formation by mass effect. Even under this condition, the yields of mercaptan can be seriously diminished by sulfide formation.

It has now been discovered, in accordance with the invention, that primary mercaptans may be prepared from olefins under simple processing conditions involving only atmospheric pressure, normal temperatures, and without the difficulty of extensive sulfide formation, by utilizing the anti-Markownikoff addition of thio acids to double bonds.

This invention, accordingly, is concerned with a process for reacting terminally unsaturated hydrocarbon compounds to produce primary mercaptans in virtually quantitative yield. The process comprises forming a thio acid of relatively low molecular weight, such as, thioacetic acid, thiopropionic acid, thiobutyric acid, and thiobenzoic acid, reacting it with the hydrocarbon to be converted and, thereafter, hydrolyzing the thiol ester so formed to give a product in accordance with the anti-Markownikoff addition of $H_2S$ to the double bond of the olefin.

The process for synthesizing primary mercaptans in accordance with this invention, therefore, may be summarized very briefly in terms of the following equations:

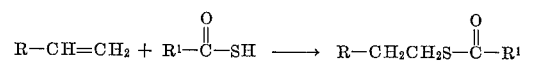

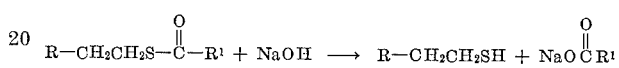

$R^1$ in the equations may be the acetic, propionic, butyric or benzoic acid moiety.

It will be noted that the formation of the thiol ester is preferably carried out in terms of reaction of thioacetic acid with an olefinically unsaturated organic compound, preferably, a hydrocarbon, having a terminal olefinic group. The reactive olefin useful for the process may be defined as any olefin corresponding to the following:

in which R may be any hydrocarbon moiety, straight-chain or branched, aromatic or cycloaliphatic. The R moiety may be as large as about 40 carbon atoms total, but generally, for making the most useful mercaptans, it need not be so large that there will be more than about 20 carbon atoms in the whole compound. The olefin utilized in this process might also be described as a mono-substituted ethylene.

Of the aromatic compounds applicable to this process, vinyl aromatics are useful. Examples of these are styrene, vinyl naphthalene, and ring substituted styrene and naphthyl compounds. Similarly, vinyl cyclohexane, a typical cycloaliphatic may be used. Examples of wholly aliphatic olefins which demonstrate the efficacy of the process are: 2-ethyl hexene-1, octene-1, dodecene-1, eicosene-1, 3-butyldecene-1, pentadecene-1, etc. Further, commercial mixtures of such olefins work equally well and there is no special requirement for purity in terms of a single olefinic compound. Of particular interest in this regard, are mixtures of hydrocarbons having terminal olefin groups in the 6 to 7 carbon atom range, the 9 to 11 carbon atom range, the 11 to 15 carbon atom range, and the 15 to 20 carbon atom range. These mixtures have been obtained by wax-cracking processes wherein very high molecular weight hydrocarbons have been reduced to fractions separable into the broad range of olefins enumerated above. Other such mixtures have, in turn, been obtained by the polymerization of olefins in the presence of aluminum alkyls. In this process, mixtures of olefins have been obtained ranging from 6 to 20 carbon atoms wherein the total number may be either odd or even. It should also be noted that more than one double bond may exist in the starting raw material. If this is the case, then only those groups which are terminal will produce the corresponding terminal olefins. Examples of such compounds are: divinylbenzene, 2-methyl-6-methylene-2, 7-octadiene, etc. The only limitation is that the starting hydrocarbon have a terminal unsaturation available and that the rest of the molecule carry no substituent which will be consumed in the reaction or will alter the process.

A real advantage of our process resides in the fact that it is carried out in two steps and that the sulphur bearing intermediate produced in the first step, that is, the thiol ester, is unreactive toward the olefin. That is, the thioacetic acid reacts with the olefin without having it participate in a competing reaction. Only after the olefin has been essentially completely converted is the mercaptan formed in the second step of the process. The free mercaptan is, therefore, never in contact with sizeable quantities of starting olefin.

For reasons of economy and convenience, the thio acid we prefer is thioacetic acid. Other lower molecular weight thio acids, such as thiopropionic, thiobutyric or thiobenzoic acids could be used but offer no special advantages.

A broad description of the process according to the invention follows:

The thioacetic acid is prepared in situ in the presence of a catalyst, either basic or acidic, so that it is available for immediate use in the reaction with the terminally unsaturated olefin. The thioacetic acid is prepared by sparging H$_2$S at atmospheric pressure or somewhat above into acetic anhydride containing a suitable catalyst. This reaction is demonstrated by the following equation:

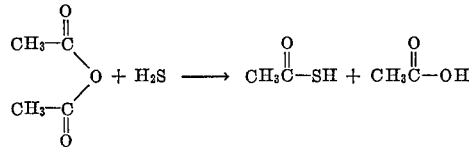

In the preparation of this acid both acidic and basic catalysts may be used. An important aspect of the process is that the thio acid does not need to be purified or used in a concentrated form for subsequent reaction. It may be used in admixture with the acetic or other organic acid which has been produced as a co-product in its formation. The thioacetic acid is then reacted with the desired olefin at elevated temperatures to form the corresponding thiol ester. This, in turn, is then hydrolyzed with an alkali metal hydroxide to form the acetate salt and the corresponding desired mercaptan. By means of this reaction, which is conducted at relatively mild temperatures and pressures, wherein the temperature normally need not exceed 125°–150° C. and generally is held substantially lower, the process results in the formation of the mercaptan in the presence of the hydrolyzing solution. This is then washed with water and acid, and the organic layer constituting the thiol is refluxed with a moisture trap to remove water by distillation with the toluene. In the process, thus, the primary mercaptan is relatively easily separated in substantially pure form.

More specifically, hydrogen sulfide is sparged into acetic anhydride at a temperature between 25 and 80° C. either at atmosphreic pressure or a little over in the presence of a suitable catalyst. Examples of acidic catalysts are sulfuric acid, toluene sulfonic, etc. Examples of basic catalysts are potassium hydroxide, sodium hydroxide, sodium carbonate, potassium carbonate, sodium acetate or organic bases such as triethylamine, pyridine, dimethyl aniline or other tertiary amines. While both of these types are usable, the basic catalysts are generally preferred since they give better rates of hydrogen sulfide absorption, higher yields of thioacetic acid and are less corrosive to processing equipment. In this instance, however, it is necessary to neutralize the basic catalysts prior to use of the thioacetic acid for further reaction. Neutralization may be carried out with phosphoric or toluene sulfonic acids to form the corresponding salts which are inert to the subsequent reaction whereas the free base compounds interfere with the olefin addition.

While not essential to the process, the thioacetic acid may be distilled, in which case it often reacts spontaneously with olefins, depending on trace amounts of peroxidic catalysts, inhibitors present, and other conditions. It may, preferably and more conveniently, be added in admixture with by-product acetic acid, unconverted acetic anhydride, and catalyst (neutralized if basic). For most economic operation and high yields, however, it is important that purification of the thioacetic acid, which decomposes to a considerable extent on distillation, be avoided. The utilization of unpurified thioacetic acid, as it occurs in the hydrogen sulfide acetic anhydride reaction mixture, is an important part of the present invention.

In the practice of our process wherein we use unpurified thio acid, a free-radical initiator is introduced into the reaction mixture by admixing it with either the thioacetic acid solution or the olefin before the reaction. This initiator is preferably an azo-catalyst which has an acyclic azo group (—N=N—) bonded to different aliphatic or cycloaliphatic carbons at least one of which is tertiary and has attached, through carbon, a negative radical consisting of a carbon atom three of whose valences are satisfied by nitrogen and/or oxygen atom(s). This negative radical is nonacidic and includes the nitrile, carbalkoxy, and carbonamide groups. Examples are: 1,1'-azobisisobutyronitrile, 1,1' - azodicyclohexanedicarbonitrile, and 1,1' - azobis - alpha,gamma - dimethylvaleronitrile. These compounds as a group are defined in U.S. Patent 2,551,813 as catalysts for the hydrogen sulfide-ethylenic compound reaction.

Because thioacetic acid decomposes at temperatures at which the decomposition of the initiator is suitably rapid, it is preferable to add the thioacetic acid solution to the olefin at a slow rate so that thioacetic acid is consumed substantially as fast as it is added and has little opportunity to decompose, for example, to diacetyl sulfide and H$_2$S. In such a case, it is preferred to mix all or most of the initiator with the thioacetic acid solution so that initiator is supplied continuously to the reaction mixture, along with thioacetic acid.

The reaction is exothermic, and it is important that good conversions and yields result from addition of thioacetic acid solution to olefin at such a temperature and rate that heat can be removed on a commercial scale. Such conditions are afforded as part of the present invention. For example, thioacetic acid solution may be added to dodecene-1 over two hours at 120°–125° C. with good results.

An excess of thioacetic acid is not necessary but is convenient in that conversion of the olefin is high and a relatively small amount of unreacted olefin remains to be fractionated from mercaptan products at the end. Also, the presence of considerable olefin in mercaptan during the saponification step is undesirable because of the possibility of reaction of the two to form sulfide.

When reaction is complete, acetic acid and unreacted thioacetic acid are removed either by distilling from the high-boiling thiol ester at reduced pressure, or, preferably, by washing out with water and base. Both acetic and thioacetic acids are water soluble, while the thiol ester is insoluble. Besides being more convenient than distillation, washing is also preferred because color bodies which may discolor the product are removed by basic washes. Dilute solutions of soda ash or caustic, the latter being the more effective for color removal, are suitable.

Hydrolysis of the thiol ester may be carried out with acid or base, but the latter is preferred because base is not corrosive to conventional stainless steel or nickel processing equipment.

A solvent may be present to homogenize the system, or, most conveniently, the ester may be saponified in a 2-phase mixture by stirring below 100° C. with caustic of suitable concentration. Too dilute caustic will give inconveniently slow reaction rate, and too concentrated (e.g. 30%) may result in an unstirrable slurry of sodium mercaptide and sodium acetate or even (e.g. 50%) an uncontrollable exotherm. The optimum caustic concentration affords a good rate of hydrolysis and easy agitation throughout the reaction. The course of the saponification may be followed by iodometric titration of samples.

When hydrolysis to mercaptan and acetate is complete, the reaction mixture is neutralized, by mineral acid, suitably phosphoric, which is non-corrosive, or by acids washed from the thiol ester, to cause separation of the mercaptan and aqueous layer, which latter is drained. The crude mercaptan, which may be assayed iodometrically, is washed once with water and distilled by methods well known to those skilled in the art, suitably at reduced pressures for the higher-boiling mercaptans.

Advantages in convenience of operation and high yield of product are apparent in the several illustrative examples hereinafter given:

*Example 1*

A solution of thioacetic acid was prepared by sparging hydrogen sulfide into 694 grams of commercial acetic anhydride with 7.0 grams technical flake hydroxide as catalyst at 50–55° C. for a period of 6 hours. The gain in weight was 210 grams (91 percent of the theoretical). In this solution were dissolved 4.5 grams azobisisobutyronitrile and 36.4 grams toluenesulfonic acid. The resulting solution, containing 20.2 percent mercaptan S by iodometric titration, was added dropwise to 916 grams dodecene-1 (97 percent pure) at 98–102° C. over 18 minutes. The mixture was stirred at 98–100° C. for 10 minutes more. Iodometric titration at this point showed 1.06 percent S, indicating consumption of most of the thioacetic acid (10 percent excess over olefin was added). The thiol ester was washed free of thioacetic and acetic acids by stirring with 910 milliliters water at 61–64° C. for 10 minutes, 910 milliliters water at 37–38° C. for 10 minutes, and then with four 910 milliliter portions of 10 percent sodium carbonate at 31–70° for 27 minutes, 44–81° over 23 minutes, 50–80° over 20 minutes, and 49–82° over 22 minutes. Considerable color was removed by these washes.

The thiol ester was saponified by stirring with 400 grams toluene, 872 grams 50 percent sodium hydroxide, and 870 milliliters water at 100–102.5° C. for 6 hours. The mixture was then diluted with 300 milliliters water and neutralized by adding 545 grams of 86 percent sulfuric acid and 500 milliliters water. The organic layer was washed by stirring with 100 milliliters water to 80° C. and then was refluxed with a moisture trap to remove water by azeotropic distillation with the toluene. Finally, the toluene was stripped at 153–155° C. and 35–38 millimeters pressure, and the residual mercaptan was distilled without rectification at 25 millimeters pressure. The yield of n-dodecyl mercaptan (15.5 percent mercaptan S, $N_D^{25}$ 1.4572, specific gravity 0.845 at 25° C., color 10 APHA, freezing point −9.2° C.) was 951 grams (86 percent of theory). The bottoms product amounted to 80 grams.

*Example 2*

A solution of thioacetic acid was prepared by sparging hydrogen sulfide into 1100 grams acetic anhydride with 12.0 grams pyridine as catalyst at 50–55° C. for a period of 7 hours. The gain in weight was 320 grams (87 percent of the theoretical). In this solution were dissolved 15.3 grams 105 percent phosphoric acid; iodometric titration showed 20.1 percent mercaptan S. To this solution was added 9.0 grams azobisisobutyronitrile, and the resulting solution was added dropwise to 1390 grams dodecene-1 (97 percent pure) and 1.0 gram azobisisobutyronitrile at 120–125° C. over 2 hours. The reaction mixture was stirred at 120–125° C. for 10 minutes more. Iodometric titration showed 1.14 percent S at this point. The thiol ester was cooled below 100° C. and washed free of thioacetic and acetic acids by stirring with 700 milliliters water at 72–73° for 5 minutes, 700 milliliters water at 49–52° for 5 minutes, and then with four 800 gram portions of 5 percent aqueous sodium hydroxide at 45–65° over 13 minutes, 48–65° over 7 minutes, 46–80° over 14 minutes, and 53–80° over 14 minutes. Considerable color was removed by these washes.

The thiol ester was saponified by stirring with 990 grams 50 percent sodium hydroxide and 1239 milliliters water at 89–91° C. for 7.8 hours. The mixture was neutralized by adding 235 grams of 105 percent phosphoric acid. The organic layer was washed by stirring with 500 milliliters water and then was dried by stirring at 110–120° C. under 50 millimeter pressure until distillation of water ceased. The residual crude mercaptan (1640 grams; 14.4 percent S by iodometric titration) was rectified in a still with fractionating column by methods well known to those skilled in the art. The n-dodecyl mercaptan fraction distilled at a head temperature of 155–157° C. (at 25 millimeters) and amounted to 1388 grams (83 percent of theory). It assayed 15.8 percent mercaptan S, and had a color of 10 APHA. The bottoms product amounted to 182 grams.

*Example 3*

Thioacetic acid solution was prepared, and the pyridine therein was neutralized with phosphoric acid, as in Example 2. In 880 grams of this solution (containing 18.4 percent mercaptan S) was dissolved 5.0 grams azobisisobutyronitrile, and the resulting solution was added dropwise to 514 grams 2-ethyl-1-hexene containing 0.5 gram azobisisobutyronitrile at 100–110° C. over 1 hour and 15 minutes. After stirring for 10 minutes more at 100–110° C., the thiol ester was washed free of acids in the manner of Example 2 and saponified with 500 grams 50 percent sodium hydroxide and 125 milliliters water at 89–91° C. for 8 hours. The mixture was neutralized with 105 percent phosphoric acid (180 grams), and the crude mercaptan was washed with water, dried by heating to 186° C. to drive off water, and fractionated at reduced pressure to give 2-ethyl-1-hexanethiol (407 grams, 61 percent of theory), boiling point 101–102° C. at 50 millimeters, $N_D^{25}$ 1.4550, specific gravity at 25° C. 0.852, 22.2 percent mercaptan S. The theoretical percent S is 21.9.

*Example 4*

Thioacetic acid solution was prepared and pyridine therein was neutralized with phosphoric acid, as in Example 2. In 528 grams of this solution (containing 18.4 percent mercaptan S) was dissolved 5.0 grams azobisisobutyronitrile, and the resulting solution was added dropwise to 500 grams of an alpha-olefin fraction consisting of a mixture of straight-chain olefins of 11 to 15 carbon atoms (2 percent $C_{10}$, 13 percent $C_{11}$, 24 percent $C_{12}$, 23 percent $C_{13}$, 23 percent $C_{14}$, 14 percent $C_{15}$, 1 percent $C_{16}$; bromine number 94; average molecular weight 179; boiling range 174–270° C. at 10 millimeters of mercury) containing 0.5 grams azobisisobutyronitrile at 120–125° C. over 35 minutes. After stirring for 10 minutes more at 120–125° C., the thiol ester was washed free of acids in the manner of Example 2 and saponified with 330 grams 50 percent sodium hydroxide and 330 milliliters more water added after an hour to thin the mixture, at 89–91° C. for 8 hours. The mixture was neutralized with 105 percent phosphoric acid (101 grams), and the crude mercaptan was washed with water and dried by stirring at 125° C. and 125 millimeters pressure. It was then fractionated at reduced pressure to give one mercaptan fraction of 270 grams, 14.4 percent mercaptan S, $N_D^{25}$ 1.4573, specific gravity 0.841 at 25° C., boiling at 140–175° C. at 25 millimeters and another mercaptan fraction (98 grams, 14.0 percent mercaptan S, $N_D^{25}$ 1.4608, specific gravity 0.849 at 25° C.) boiling at 175–181° C. at 25 millimeters pressure. The combined fractions consist of mercaptans having essentially from 11–15 carbon atoms, useful as molecular weight regulators in hot rubber polymerization.

Example 5

Thioacetic acid solution was prepared, and the pyridine therein was neutralized with phosphoric acid, as in Example 2. In 816 grams of this solution (containing 18.4 percent mercaptan S) was dissolved 4.0 grams azobisisobutyronitrile, and the resulting solution was added dropwise to 443 grams styrene at 120–125° C. over 1 hour. After stirring for 10 minutes more at 120–125° C., the thiol ester was washed free of acids by means of water and 5 percent sodium hydroxide, in the manner of Example 2, and saponified with 510 grams 50 percent sodium hydroxide and 660 milliliters water at 89–91 C. for 7 hours. The mixture was neutralized with 105 percent phosphoric acid (251 grams), and the crude mercaptan was washed with water, dried by stirring at 110–125° C. and 120–150 millimeters pressure, and fractionated at reduced pressure to give water-white 2-phenylethyl mercaptan (179 grams) $N_D^{25}$ 1.5584, specific gravity at 25° C. 1.03, boiling range 109–110° C. at 25 millimeters pressure.

Example 6

A solution of thioacetic acid was prepared by sparging hydrogen sulfide into 2170 grams acetic anhydride with 23.7 grams pyridine catalyst at 50–55° C. for a period of 8 hours. The gain in weight was 651 grams (95.5 percent of the theoretical). In this solution was dissolved 32.4 grams of 105 percent phosphoric acid. Iodometric titration showed 20.6 percent mercaptan S.

To 764 grams of this solution was added 5.0 grams of azobisisobutyronitrile, and the resulting solution was added dropwise to 512 grams octene-1 (of about 98 percent purity) and 0.5 gram azobisisobutyronitrile at 107–115° C. over 70 minutes. The reaction mixture was stirred at 107–110° C. for 10 minutes more. Iodometric titration showed 0.68 percent S at this point. The thiol ester was cooled below 100° C. and washed free of thioacetic and acetic acids by stirring with 350 milliliters water at 70–67° C. over 5 minutes, 350 milliliters water at 47–45° C. over 5 minutes, and then with four 400 gram portions of 5 percent aqueous sodium hydroxide at 42–65° C. over 6 minutes, 48–65° over 4 minutes, 48–81° over 10 minutes, and 57–80° over 8 minutes. Considerable color was removed by these washes.

The thiol ester was saponified by treating with 535 grams 50 percent sodium hydroxide at 87–95° C., water (500 milliliters) being added as necessary to thin the slurry of mercaptide and sodium acetate. 200 grams additional 50 percent sodium hydroxide was added, and the mixture was stirred at 85–90° C. for 5 hours. After neutralization by 334 grams 105 percent phosphoric acid, the organic layer was washed by stirring with 200 milliliters water and then dried by heating to 185° C. (with a moisture trap) to drive off water. The crude mercaptan was fractionated at reduced pressure (50 millimeters) to give unreacted olefin (17 grams) midcut, and then n-octyl mercaptan (527 grams, 81 percent of theory), boiling point 107–109° C. at 50 millimeters, $N_D^{25}=1.4523$, specific gravity at 25° C. 0.842, 22.2 percent mercaptan S. The theoretical content of S is 21.9 percent.

Example 7

Thioacetic acid solution was prepared, and the pyridine therein was neutralized, as in Example 6. In 291 grams of this solution (containing 20.6 percent mercaptan S) was dissolved 5.0 grams azobisisobutyronitrile, and the resulting solution was added dropwise to 500 grams eicosene-1 (of about 90 percent purity) containing 0.5 gram azobisisobutyronitrile at 110–115° C. over 1 hour. After stirring at 110–115° C. for 10 minutes more, the thiol ester was washed free of acids in the manner of Example 6 and saponified by stirring with 204 grams 50 percent aqueous sodium hydroxide and 204 milliliters water (150 milliliters more water added after 1.5 hours to thin the mixture) at 89–91° for 4.25 hours. The mixture was neutralized with 105 percent phosphoric acid (197 grams), and the crude mercaptan was washed with water, dried by stirring at 110–120° C. and 21 millimeters pressure, and distilled without rectification by adding continuously to a 1-plate still under a vacuum of 10–11 millimeters. The distillate (372 grams) was a pale-yellow solid (freezing point 31° C.) and contained 8.50 percent mercaptan S, showing it to be approximately 83 percent 1-eicosanethiol (10.2 percent S) (56 percent of theory), and remainder being unconverted eicosene.

Example 8

Thioacetic acid was prepared, and the pyridine therein neutralized, as in Example 6.

In 786 grams of this solution (20–6 percent mercaptan S) was dissolved 5.0 grams of azobisisobutyronitrile, and the resulting solution was added dropwise to a refluxing solution of 0.5 gram azobisisobutyronitrile in 400 grams hexene-1 (of about 95 percent purity) at 53–96° C. over 1.33 hours. After stirring at 96–98° C. for 10 minutes more, the thiol ester was washed free of acids in the manner of Example 6 and saponified by heating up and dropping in 550 grams 50 percent sodium hydroxide at such a rate as to maintain the mixture at 90–99° C. The mixture then was thinned with 150 milliliters water and stirred at 85–90° C. for 5 hours. After neutralization with 335 grams 105 percent phosphoric acid, the crude mercaptan was washed with water, dried by refluxing (150° C.) with a moisture trap, and fractionated at atmospheric pressure to give a forerun (20 grams) boiling at 68–159° C. and then 1-hexanethiol (432 grams, 80 percent of theory), boiling point 150–153° C., $N_D^{25}$ 1.4477, specific gravity at 25° C. 0.839, 28 percent mercaptan S. The theoretical content of S is 27.2 percent.

Example 9

Thioacetic acid was prepared, and the pyridine therein neutralized, as in Example 6.

In 849 grams of this solution (containing 20.3 percent mercaptan S) was dissolved 5.0 grams azobisisobutyronitrile, and the resulting solution was added dropwise to a refluxing solution of 0.5 gram azobisisobutyronitrile in 400 grams cyclohexene (boiling point 82–83.5°, $N_D^{25}$ 1.448) at 82–112° C. over 67 minutes. After stirring at 110–115° C. for 10 minutes more, the thiol ester was washed free of acids in the manner of Example 6 and saponified by stirring at about 90° with 585 grams 50 percent sodium hydroxide, 500 milliliters water being added in portions to thin the mixture for three hours. After neutralization with 340 grams 105 percent phosphoric acid, the crude mercaptan was washed with water, dried by refluxing (157° C.) with a moisture trap, and fractionated at atmospheric pressure to give a forerun (7 grams) consisting mainly of unreacted cyclohexene and boiling at 82–91° C., a midcut (19 grams) boiling at 91–157° C., and then cyclohexanethiol (419 grams, 75 percent of theory), boiling point 157–158° C., $N_D^{25}$ 1.4919, specific gravity at 25° C., 0.949; 27.6 percent mercaptan S. Boiling point 157–162° C., $N_D^{25}$ 1.4933, specific gravity at 20° C., 0.949.

The theoretical content of S is 28.1 percent.

Example 10

Following the procedure of Example 4, and using a hydrocarbon fraction having components in the range of 15 to 20 carbon atoms, these being of terminal unsaturation, having a boiling range of 227–375° C. at 10 millimeters and average molecular weight of 242, this fraction was reacted with freshly prepared thiol acetic acid to yield a primary mercaptan composition. Analysis shows good yield.

In these several examples, 1–10, thioacetic acid was used for its convenience and economy. Thiopropionic, thiobutyric and thiobenzoic acids are used in the same fashion with no significant changes in reaction parameters.

It will be seen from the examples given above, Examples 1–10, that procedurally, the process involves reaction of the olefin under conditions which avoid a side reaction, thereby achieving a good commercial yield, usually a substantial approach to quantitative.

Useful primary mercaptan products are formed by reacting olefin fractions having compositions which correspond to mixtures of hydrocarbons of molecular weight between six carbon atoms and about 40 carbon atoms. Generally, those having average molecular weights between 10–15 carbon atoms, 11–16 and 15–20 carbon atoms are most useful. These are obtained through process of cracking paraffin waxes. The wax is subjected to a cracking process and thereafter fractions collected. From the milder cracking processes, these fractions are available and, generally, are characterizable by the fact that they are primary, or terminally unsaturated. These fractions are converted to mercaptans by carrying out the process in accordance with any one of the examples above.

Though the invention has been described in reference to only a limited number of examples, it is to be noted that variants thereof may be practiced without departing from its spirit or scope.

What is claimed is:
1. The method of forming primary mercaptans by reacting an olefinic unsaturated compound of the general formula R—CH=CH$_2$ wherein R is a hydrocarbon with a thio acid of the general formula

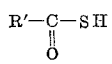

wherein R' is a hydrocarbon radical of 1 to 6 carbon atoms, said reaction being carried out in the presence of a catalyst consisting of an azo compound which has an azo group (—N=N—) bonded to unlike hydrocarbons selected from the group consisting of aliphatic and cycloaliphatic carbons, at least one of which is tertiary and has attached through carbon, a negative radical consisting of a carbon atom, three of whose valences are satisfied by an element selected from the group consisting of nitrogen and oxygen, to form the corresponding thiol ester and, thereafter, hydrolyzing said ester to form a primary mercaptan.

2. The method of claim 1 wherein R of the olefin is a hydrocarbon moiety having from 4 to 42 carbon atoms.
3. The method of claim 1 wherein the olefin is dodecene-1.
4. The method of claim 1 wherein the olefin is octene-1.
5. The method of claim 1 wherein the thioacid is thioacetic acid.
6. The method of claim 5 wherein the thioacetic acid is prepared in situ.
7. The method of claim 6 wherein the initiating catalyst is azo-bis-isobutyronitrile.
8. The method of claim 7 wherein the azo-bis-isobutyronitrile is present in an amount in the range 0.05 to 5 percent based upon the olefin.
9. The method of forming primary mercaptans from an olefin having the formula R—CH=CH$_2$ wherein R is a hydrocarbon which comprises forming thioacetic acid from acetic anhydride and hydrogen sulfide in the presence of a catalyst, neutralizing said catalyst, dissolving an azo compound having the group (—N=N—) bonded to a carbon atom of an unlike hydrocarbon selected from the group consisting of aliphatic and cycloaliphatic radicals, at least one of which is tertiary and has attached through carbon, a negative radical consisting of a carbon atom, three of whose valences are satisfied by an element selected from the group consisting of nitrogen and oxygen, dissolving said azo compound in the resulting thioacetic acid containing solution and reacting said solution with the olefinic compound to give the corresponding thiol ester and, thereafter, hydrolyzing said ester to form the primary mercaptan.
10. The method of claim 9 wherein said azo compound is azo-bis-isobutyronitrile.
11. The method of claim 10 wherein the olefin contains 6 to 20 carbon atoms and is derived from a wax-cracking process.
12. The process of claim 10 wherein the olefin is a mixture of olefins having 4 to 42 carbon atoms and is derived from the polymerization of olefins selected from the group consisting of ethylene and propylene.
13. The method of forming n-dodecyl mercaptan from dodecene-1 which comprises forming thioacetic acid from acetic anhydride and hydrogen sulfide in the presence of a catalyst neutralizing the reaction product, dissolving azo-bis-isobutyronitrile in the resulting thioacetic acid containing solution and reacting said solution with dodecene-1 to give the corresponding thiol ester and, thereafter, hydrolyzing said ester to form n-dodecyl mercaptan.

References Cited by the Examiner
UNITED STATES PATENTS

| | | | |
|---|---|---|---|
| 2,031,529 | 2/1936 | Elbel et al. | 260—609 |
| 2,238,790 | 4/1941 | Davis et al. | 260—609 |
| 2,551,813 | 5/1951 | Pinkney | 260—609 |
| 2,626,279 | 1/1953 | Crouch et al. | 260—455 |

OTHER REFERENCES

Ipatieff et al.: J.A.C.S., vol. 61, 1959, pages 71 to 73.
Reid: "Organic Chemistry of Divalent Sulfur," 1962, page 31.

CHARLES B. PARKER, *Primary Examiner.*
DELBERT R. PHILLIPS, *Assistant Examiner.*

Dedication 3,270,063.—*Joseph Fath*, Barrington, R.I., and *John M. Kolyer*, Seekonk, Mass. METHODS OF MAKING PRIMARY MERCAPTANS. Patent dated Aug. 30, 1966. Dedication filed Mar. 29, 1972, by the assignee, *Teknor Apex Company*.

Hereby dedicates to the Public the remaining term of said patent.

[*Official Gazette May 9, 1972.*]